Patented Oct. 26, 1948

2,452,165

UNITED STATES PATENT OFFICE 2,452,165

HETEROPOLYMER OF ISOPROPENYL ACETATE AND MALEIC ANHYDRIDE

Cornelius C. Unruh and William O. Kenyon, Rochester, N. Y., assignors to Eastman Kodak Company, Rochester, N. Y., a corporation of New Jersey No Drawing. Application November 27, 1945, Serial No. 631,215

5 Claims. (Cl. 260—78.5)

This invention relates to a heteropolymer of isopropenyl acetate and maleic anhydride.

It is known that vinyl compounds such as vinyl esters and styrene are homopolymerizable to high molecular weight compounds and can be copolymerized with unsaturated compounds, for example, maleic anhydride, esters and other derivatives of maleic, fumaric, citraconic and mesaconic acids to give resinous copolymers. In contrast isopropenyl acetate is neither a vinyl compound nor homopolymerizable to a high molecular weight resin. Furthermore, unlike vinyl acetate and styrene, isopropenyl acetate will not copolymerize with mesaconic acid or its esters, or with citraconic acid, its esters or anhydride to give high molecular weight resins.

We have found, however, that isopropenyl acetate can be heteropolymerized with maleic anhydride, and with esters of maleic and fumaric acids to give products of value for the preparation of enteric coatings, thickeners, acid fixers of basic dyes, and as resinous intermediates.

It is accordingly, an object of our invention to provide a new resinous heteropolymer. A further object is to provide a process for preparing our new resins. Other objects will become apparent hereinafter.

In the practice of our invention, we have found that the polymerization reaction is accelerated by heat, and by polymerization catalysts which are known to promote the polymerization of vinyl compounds. Exemplary of such catalysts are the organic peroxides including benzoyl peroxide, acetyl peroxide, lauroyl peroxide, and inorganic peroxides including hydrogen peroxide, alkali metal perborates, alkali metal persulfates, and similar kinds of compounds. The temperature at which the heteropolymerization is effected may vary from slightly above room temperatures to the boiling point of the mixture of the starting monomers. The polymerization may be carried out in an open or closed container. A diluent agent can be employed, preferably one which is a solvent for the heteropolymer. An excess of isopropenyl acetate gives an improved yield of the heteropolymeric product.

Our new heteropolymer can be further reacted with monohydric alcohols in the presence of a suitable catalyst to form new resinous ester-lactone derivatives having chemical and physical characteristics highly suited for the manufacture of molding compounds and strong, flexible coating or sheeting materials.

The following examples will serve to illustrate our new resinous heteropolymer and the manner of obtaining the same.

EXAMPLE I.—HETEROPOLYMERIZATION OF ISOPROPENYL ACETATE AND MALEIC ANHYDRIDE

A. *Without solvent*

58.8 grams (0.6 mole) of maleic anhydride were dissolved in 60 grams (0.6 mole) of isopropenyl acetate and 0.12 grams of benzoyl peroxide were added. The flask containing the reaction mixture was fitted with a reflux condenser and heated on a steam bath with occasional stirring. When the temperature reached the boiling point of the isopropenyl acetate, a vigorous reaction took place and the mixture set to a clear, almost colorless resin. This was cooled and dispersed in acetone. The resulting dope was poured into benzene to precipitate the polymer, which was leached with fresh benzene and dried at 60° C. The yield was 75 grams. The specific viscosity in acetone was 0.061. Chemical analysis of the heteropolymer gave 49.7 per cent by weight of maleic anhydride compared to 49.5 per cent theoretical calculated for the formula $(C_9H_{10}O_5)_n$.

B. *In solvent*

58.8 grams (0.6 mole) of maleic anhydride, 60 grams (0.6 mole) of isopropenyl acetate and 0.25 ccs. of 30 per cent hydrogen peroxide were dissolved in 80 ccs. acetone and the solution heated on a steam bath under reflux for 10 hours. A viscous nearly colorless dope was obtained. This was diluted with acetone and precipitated in benzene. The precipitate was extracted with fresh benzene and dried at 60° C. The yield was 72 grams. The specific viscosity of the polymer in acetone was 0.075. Chemical analysis of the heteropolymer gave 48.5 per cent by weight maleic anhydride compared to 49.5 per cent theoretical calculated for $(C_9H_{10}O_5)_n$.

EXAMPLE II.—HEXYL ESTER OF THE LACTONE OF THE ISOPROPENYL ACETATE-MALEIC ANHYDRIDE HETEROPOLYMER 125 grams of the isopropenyl acetate-maleic anhydride heteropolymer prepared in the manner described in Example I were heated with 1500 ccs. of normal hexyl alcohol on a steam bath, until a uniform, viscous solution was obtained. To this was added with stirring, a solution adjusted to a temperature of 75° C. and consisting of a mixture of 200 ccs. of concentrated sulphuric acid and 1000 ccs. of normal hexyl alcohol. The reaction mixture was then heated on a steam bath for a period of 24 hours, which resulted in the precipitation of the product in the form of a cake. After cooling and pouring off the excess liquid, the cake was dissolved in acetone and reprecipitated in 6 liters of methyl alcohol, and extracted with several portions of fresh methyl alcohol. This treatment removed most of the color from the product. The resinous precipitate was redissolved in 1200 ccs. of acetone and precipitated in about 12 liters of distilled water. The fibrous product was obtained in a rather soft condition, but hardened with continued soaking in distilled water. It was then washed free from acid with distilled water and dried at 50° C. The yield was 112 grams of fibrous product. The specific viscosity in acetone was 0.104. Chemical analysis gave only 0.5 per cent by weight of acetyl group and 3.69 per cent by weight of carboxyl group calculated as maleic acid, indicating thereby that the product consisted almost entirely of the hexyl ester-lactone derivative. The product dissolved and coated from an acetone solution gave a film which was clear, strong and flexible. The product was moldable with or without plasticizers, into finished shapes by extrusion, injection or compression methods, said solid shapes or masses being workable by heat or mechanical means such as kneading, rolling, compressing, drawing, cutting, filing, boring, and the like.

Incomplete polymerization of our new resinous heteropolymer yields a syrupy mass, which is useful as an impregnating agent for porous substances, for example, paper or textiles, and as a cement for binding together surfaces such as glass, metals, paper, boards and textile materials. The syrupy heteropolymer can also be applied on various materials or injected into molds, and then subjected to a heat treatment to complete the polymerization.

While the process of preparing our new heteropolymeric resin has been illustrated in Example I with equivalent molar quantities of the unsaturated monomeric components in the starting reaction mixture, the process is not limited to this specific proportion. We have found that regardless of the molar ratio of isopropenyl acetate to maleic anhydride in the starting mixture, the resinous product always contains these units in a molar ratio of about 1:1. Thus, the molar ratio of monomeric isopropenyl acetate to monomeric maleic anhydride in the starting mixture may vary, for example, from 1:9 to 9:1 and yet obtain a 1:1 heteropolymer. If either monomer is in excess, the excess amount does not polymerize, but remains essentially in its monomeric form which can be readily separated from the resinous heteropolymer, for example, by extracting the excess maleic anhydride or isopropenyl acetate with a solvent such as benzene or an alcohol.

The ester-lactone resin described in Example II of this specification has been described and claimed in copending application Serial No. 631,214, in the name of L. M. Minsk and W. O. Kenyon.

What we claim is:

1. A resinous heteropolymer of isopropenyl acetate and maleic anhydride, the molar ratio of isopropenyl acetate to maleic anhydride being 1:1.

2. A process for preparing a resinous heteropolymer comprising heating to reacting temperature in the presence of a polymerization catalyst, a mixture of from 1 to 9 molecular parts of isopropenyl acetate and from 9 to 1 molecular parts of maleic anhydride.

3. A process for polymerizing a resinous heteropolymer comprising heating to reacting temperature, in the presence of an organic peroxide catalyst, a mixture of from 1 to 9 molecular parts of isopropenyl acetate and 9 to 1 molecular parts of maleic anhydride.

4. A process for preparing a resinous heteropolymer comprising heating to reacting temperature, in the presence of benzoyl peroxide, a mixture of from 1 to 9 molecular parts of isopropenyl acetate and from 9 to 1 molecular parts of maleic anhydride.

5. A process for preparing a resinous heteropolymer comprising heating to reacting temperature, in the presence of hydrogen peroxide, a mixture of from 1 to 9 molecular parts of isopropenyl acetate and 9 to 1 molecular parts of maleic anhydride dissolved in an inert solvent.

CORNELIUS C. UNRUH.
WILLIAM O. KENYON.

REFERENCES CITED

The following references are of record in the file of this patent:

UNITED STATES PATENTS

| Number | Name | Date |
| --- | --- | --- |
| 2,306,071 | McNally et al. | Dec. 22, 1942 |
| 2,396,785 | Hanford | Mar. 19, 1946 |